(12) United States Patent
Nguyen

(10) Patent No.: US 6,976,156 B1
(45) Date of Patent: Dec. 13, 2005

(54) PIPELINE STALL REDUCTION IN WIDE ISSUE PROCESSOR BY PROVIDING MISPREDICT PC QUEUE AND STAGING REGISTERS TO TRACK BRANCH INSTRUCTIONS IN PIPELINE

(75) Inventor: Hung T. Nguyen, Plano, TX (US)

(73) Assignee: LSI Logic Corporation, Milpitas, CA (US)

( * ) Notice: Subject to any disclaimer, the term of this patent is extended or adjusted under 35 U.S.C. 154(b) by 341 days.

(21) Appl. No.: 10/047,515

(22) Filed: Oct. 26, 2001

(51) Int. Cl.[7] .............................................. G06F 9/38
(52) U.S. Cl. ...................... 712/237; 712/219; 712/235; 712/239
(58) Field of Search ..................... 711/213; 712/207, 712/219, 235, 237, 239, 245

(56) References Cited

U.S. PATENT DOCUMENTS

| | | | |
|---|---|---|---|
| 5,644,759 A * | 7/1997 | Lucas et al. | 712/240 |
| 5,796,998 A * | 8/1998 | Levitan et al. | 712/239 |
| 5,918,046 A * | 6/1999 | Hoyt et al. | 712/239 |
| 5,933,850 A * | 8/1999 | Kumar et al. | 711/125 |
| 5,954,814 A * | 9/1999 | Zaidi et al. | 712/227 |
| 6,578,134 B1 * | 6/2003 | Van Dyke et al. | 712/219 |
| 6,643,770 B1 * | 11/2003 | Kacevas | 712/235 |

* cited by examiner

Primary Examiner—Kenneth S. Kim
(74) Attorney, Agent, or Firm—Hitt Gaines PC

(57) ABSTRACT

For use in a wide-issue pipelined processor, a mechanism for, and method of, reducing pipeline stalls between conditional branches and a digital signal processor (DSP) incorporating the mechanism or the method. In one embodiment, the mechanism includes: (1) a mispredict program counter (PC) generator that generates a mispredict PC value for each conditional branch instruction in a pipeline of the processor and (2) mispredict PC storage, coupled to the mispredict PC generator, that stores the mispredict PC value at least until a resolution of the conditional branch instruction occurs and makes the mispredict PC value available to a PC of the processor if the resolution results in a mispredict condition. The mispredict PC storage includes a mispredict PC queue and a number of staging registers wherein the mispredict PC queue has at least as many stages as the number of staging registers.

23 Claims, 6 Drawing Sheets

ALU: Arithmetic & Logic Unit
MAU: Multiply-Accumulate & Arithmetic Unit
ARF: Address Register File
ORF: Operand Register File

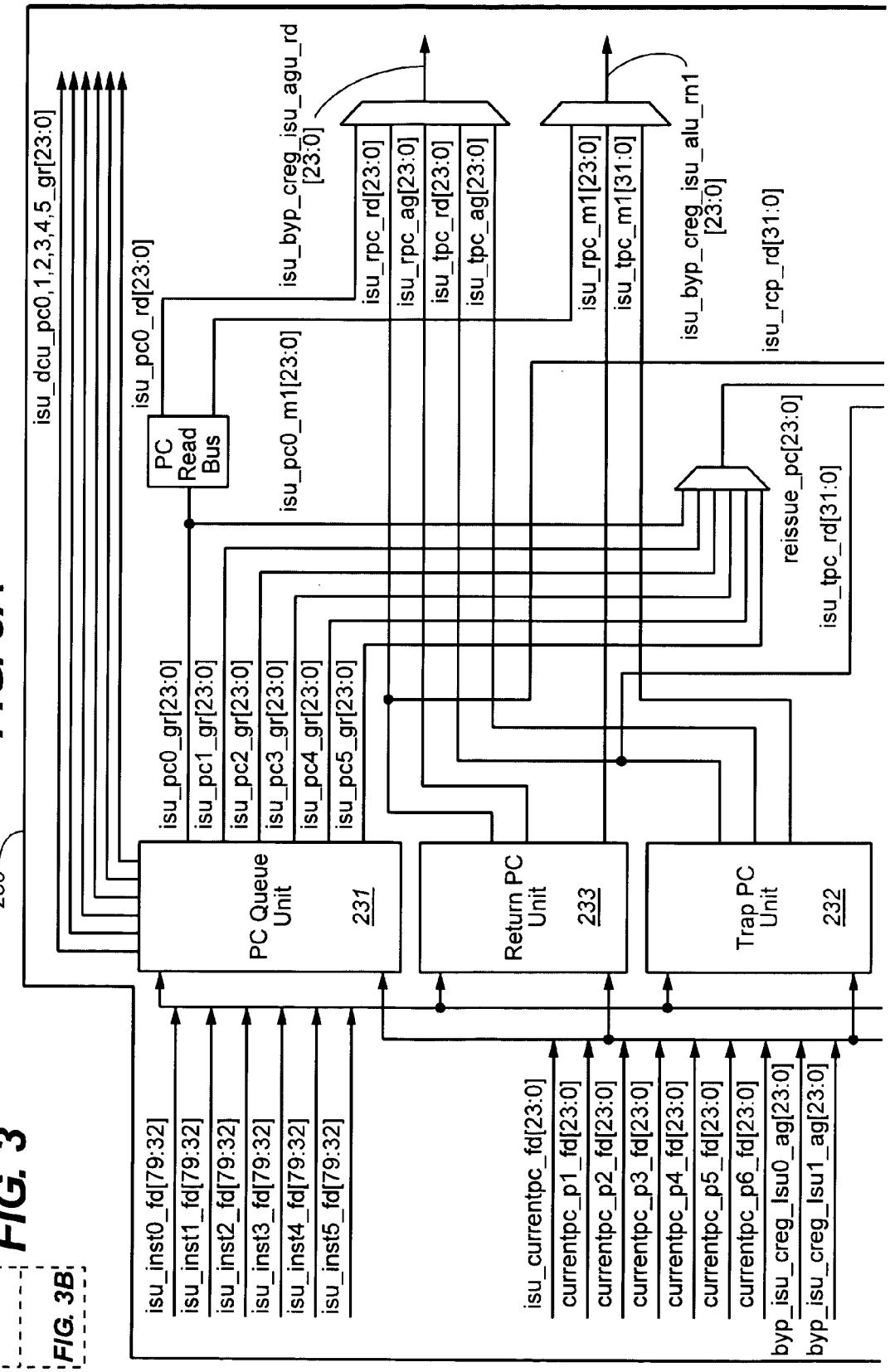

PIPELINE STALL REDUCTION IN WIDE ISSUE PROCESSOR BY PROVIDING MISPREDICT PC QUEUE AND STAGING REGISTERS TO TRACK BRANCH INSTRUCTIONS IN PIPELINE

TECHNICAL FIELD OF THE INVENTION

The present invention is directed, in general, to digital signal processors (DSPs) and, more specifically, to a mechanism and method for reducing pipeline stalls between conditional branches and a DSP incorporating the mechanism or the method.

BACKGROUND OF THE INVENTION

Over the last several years, DSPs have become an important tool, particularly in the real-time modification of signal streams. They have found use in all manner of electronic devices and will continue to grow in power and popularity.

As time has passed, greater performance has been demanded of DSPs. In most cases, performance increases are realized by increases in speed. One approach to improve DSP performance is to increase the rate of the clock that drives the DSP. As the clock rate increases, however, the DSP's power consumption and temperature also increase. Increased power consumption is expensive, and intolerable in battery-powered applications. Further, high circuit temperatures may damage the DSP. The DSP clock rate may not increase beyond a threshold physical speed at which signals may traverse the DSP. Simply stated, there is a practical maximum to the clock rate that is acceptable to conventional DSPs.

An alternate approach to improve DSP performance is to increase the number of instructions executed per clock cycle by the DSP ("DSP throughput"). One technique for increasing DSP throughput is pipelining, which calls for the DSP to be divided into separate processing stages (collectively termed a "pipeline"). Instructions are processed in an "assembly line" fashion in the processing stages. Each processing stage is optimized to perform a particular processing function, thereby causing the DSP as a whole to become faster.

"Superpipelining" extends the pipelining concept further by allowing the simultaneous processing of multiple instructions in the pipeline. Consider, as an example, a DSP in which each instruction executes in six stages, each stage requiring a single clock cycle to perform its function. Six separate instructions can therefore be processed concurrently in the pipeline; i.e., the processing of one instruction is completed during each clock cycle. The instruction throughput of an n-stage pipelined architecture is therefore, in theory, n times greater than the throughput of a non-pipelined architecture capable of completing only one instruction every n clock cycles.

Another technique for increasing overall DSP speed is "superscalar" processing. Superscalar processing calls for multiple instructions to be processed per clock cycle. Assuming that instructions are independent of one another (the execution of each instruction does not depend upon the execution of any other instruction), DSP throughput is increased in proportion to the number of instructions processed per clock cycle ("degree of scalability"). If, for example, a particular DSP architecture is superscalar to degree three (i.e., three instructions are processed during each clock cycle), the instruction throughput of the DSP is theoretically tripled.

These techniques are not mutually exclusive; DSPs may be both superpipelined and superscalar. However, operation of such DSPs in practice is often far from ideal, as instructions tend to depend upon one another and are also often not executed efficiently within the pipeline stages. In actual operation, instructions often require varying amounts of DSP resources, creating interruptions ("bubbles" or "stalls") in the flow of instructions through the pipeline. Consequently, while superpipelining and superscalar techniques do increase throughput, the actual throughput of the DSP ultimately depends upon the particular instructions processed during a given period of time and the particular implementation of the DSP's architecture.

The speed at which a DSP can perform a desired task is also a function of the number of instructions required to code the task. A DSP may require one or many clock cycles to execute a particular instruction. Thus, in order to enhance the speed at which a DSP can perform a desired task, both the number of instructions used to code the task as well as the number of clock cycles required to execute each instruction should be minimized.

One conventional technique employed to increase DSP performance is speculative execution (now called "dynamic execution" to connote less risk). Speculative execution employs a technique called "branch prediction" whereby the outcomes of conditional branch instructions are predicted. Once outcomes are predicted, resulting instructions can be retrieved from memory and placed in the pipeline for execution.

Unfortunately, predictions are at best educated guesses; the outcome of conditional branches cannot truly be determined ("resolved") until their instructions are late in the pipeline, typically in its execution stage. If the outcome of a conditional branch has not been predicted correctly (a "mispredict," giving rise to a "mispredict condition"), the entire state of the DSP must be restored to the point at which it was when the misprediction occurred. This restoration involves, among other things, a flushing of the entire pipeline, a restoration of registers in the register file(s) and a resetting of the program counter (PC) such that it points to the instructions that should have been executed. All of this takes precious time.

Moreover, depending on the depth of the pipeline, there could be several conditional branches that enter the pipeline before the first branch is resolved. Without the mispredict PC FIFO, the second branch has to be stalled until the first branch is grouped in GR stage. This causes the performance issues because the prefetch the can not prefetch the branch targets ahead of time.

What is needed in the art is a way to generate multiple branch predictions and mispredict PCs and store them for later use without waiting for branches to be grouped. This would allow the predictions to be used to prefetch instructions.

In addition, what is needed in the art is a way to increase the speed with which a processor can be restored from a mispredict condition. More specifically, what is needed in the art is a way to speed the process of restoring a PC in a DSP to its correct value upon the occurrence of a misprediction.

SUMMARY OF THE INVENTION

To address the above-discussed deficiencies of the prior art, the present invention provides, for use in a wide-issue pipelined processor, a mechanism for, and method of, reducing pipeline stalls between conditional branches and a DSP incorporating the mechanism or the method. In one embodiment, the mechanism includes: (1) a mispredict PC generator that generates a mispredict PC value for each conditional branch instruction in a pipeline of the processor and (2) mispredict PC storage, coupled to the mispredict PC generator, that stores the mispredict PC value at least until a resolution of the conditional branch instruction occurs and makes the mispredict PC value available to a PC of the processor if the resolution results in a mispredict condition.

The present invention therefore introduces the broad concept of generating mispredict PC values ahead of time and storing them until conditional branches are resolved. Because they have been generated ahead of time, the mispredict PC values are ready for immediate use, thereby avoiding any delay that would occur were they required to be generated upon occurrence of a mispredict condition.

Moreover, depending upon the depth of the pipeline, several conditional branches could enter the pipeline before the first conditional branch is resolved. Without the mispredict PC storage, the second branch must be stalled until the first branch is grouped. In other words, only one conditional branch could exist in the grouping stage of the pipeline at any given time. This constrains any prefetching that may otherwise take place.

In one embodiment of the present invention, the mispredict PC generator is associated with a static branch predictor of the processor. In an embodiment to be illustrated and described, the mispredict PC generator and the static branch predictor cooperate to generate branch predict and mispredict PCS concurrently.

In one embodiment of the present invention, the mispredict PC generator generates a branch prediction and the mispredict PC value in a single clock cycle. The branch prediction may advantageously be employed to prefetch instructions. Of course, a longer time remains within the broad scope of the present invention.

In one embodiment of the present invention, the mispredict PC storage includes a mispredict PC queue and staging registers, the mispredict PC queue having at least as many registers as the number of staging registers. In an embodiment to be illustrated and described, the mispredict PC queue has one more slot than the number of staging registers, guaranteeing that the mispredict PC queue will not overflow and lose a mispredict PC value.

In one embodiment of the present invention, the mispredict PC value moves through registers in the mispredict PC storage as the conditional branch instruction moves through stages in the pipeline. In an embodiment to be illustrated and described, the mispredict PC value tracks the corresponding conditional branch instruction, simplifying the logic required to extract the proper mispredict PC value from the mispredict PC storage upon occurrence of a mispredict condition.

In one embodiment of the present invention, the resolution occurs in an execution stage of the pipeline. Those skilled in the pertinent art will understand, however, that resolution can occur in any late stage of a given pipeline.

In one embodiment of the present invention, the processor is a digital signal processor. Those skilled in the pertinent art will understand, however, that the principles of the present invention can find application in processors of many types, including non-DSP, general purpose microprocessors.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
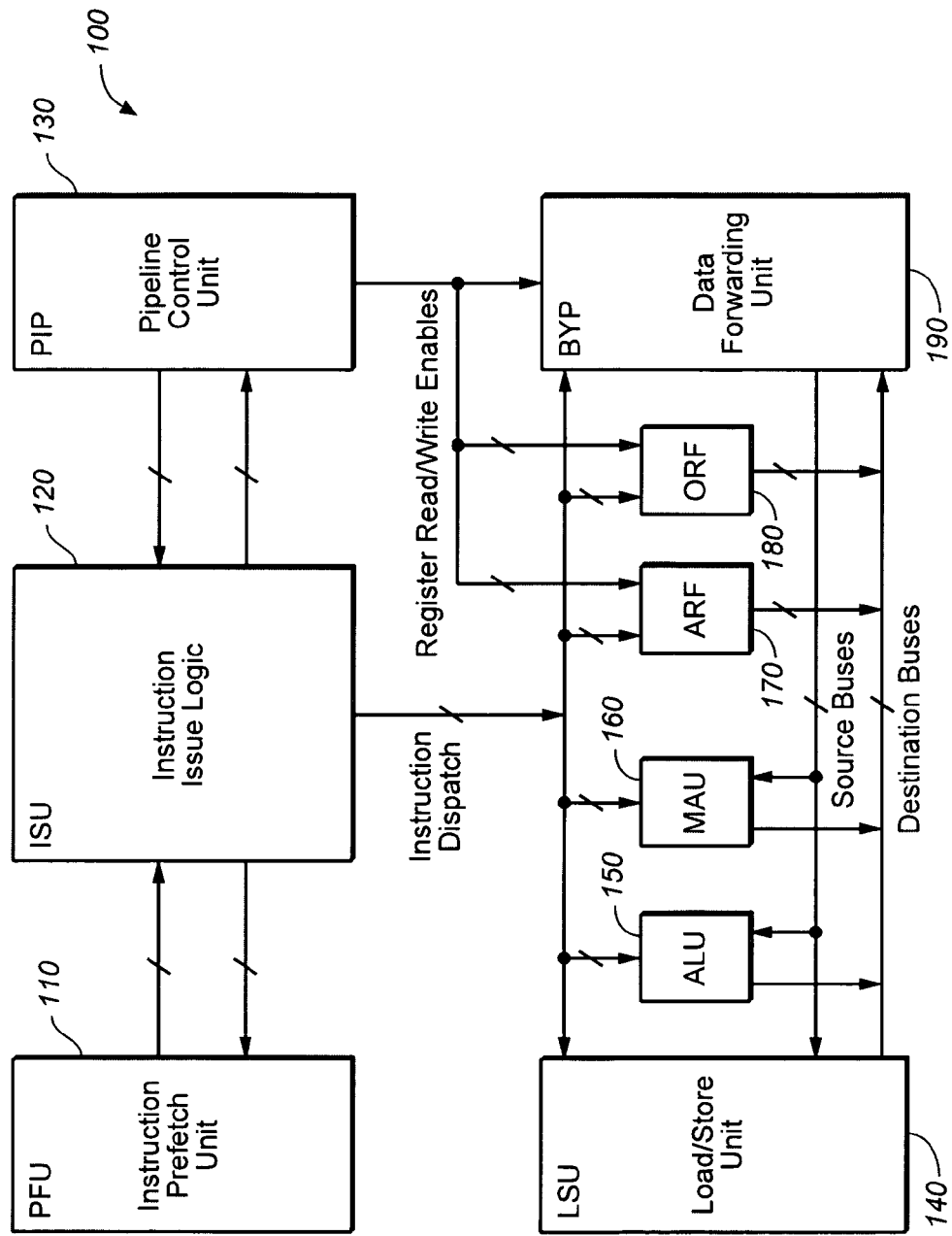
FIG. 1 illustrates an exemplary DSP which may form an environment within which a mechanism for reducing pipeline stalls between conditional branches constructed according to the principles of the present invention can operate.

Referring initially to FIG. 1, illustrated is an exemplary DSP, generally designated 100, which may form an environment within which a mechanism for reducing pipeline stalls between conditional branches constructed according to the principles of the present invention can operate. Those skilled in the pertinent art should understand that the mechanism and method of the present invention may be applied to advantage in other conventional or later-discovered DSP or general-purpose, non-DSP, processor architectures.

The DSP 100 contains an instruction prefetch unit (PFU) 110. The PFU 110 is responsible for anticipating (sometimes guessing) and prefetching from memory the instructions that the DSP 100 will need to execute in the future. The PFU 110 allows the DSP 100 to operate faster, because fetching instructions from memory involves some delay. If the fetching can be done ahead of time and while the DSP 100 is executing other instructions, that delay does not prejudice the speed of the DSP 100.

The DSP 100 further contains instruction issue logic (ISU) 120. The ISU 120 is responsible for the general task of instruction "issuance," which involves decoding instructions, determining what processing resources of the DSP 100 are required to execute the instructions, determining to what extent the instructions depend upon one another, queuing the instructions for execution by the appropriate resources (e.g., arithmetic logic unit, multiply-accumulate unit and address and operand register files) and retiring instructions after they have been executed or are otherwise no longer of use. Accordingly, the ISU 120 cooperates with the PFU 110 to receive prefetched instructions for issuance.

In a normal operating environment, the DSP 100 processes a stream of data (such as voice, audio or video), often in real-time. The DSP 100 is adapted to receive the data stream into a pipeline (detailed in Table 1 below and comprising eight stages). The pipeline is under control of a pipeline control unit (PIP) 130. The PIP 130 is responsible for moving the data stream through the pipeline and for ensuring that the data stream is operated on properly. Accordingly, the PIP 130 coordinates with the ISU 120 to ensure that the issuance of instructions is synchronized with the operation of the pipeline, that data serving as operands for the instructions are loaded and stored in proper place and that the necessary processing resources are available when required.

TABLE 1

Pipeline Stages

| Stage | Employed to |
|---|---|
| Fetch/Decode (F/D) | fetch and decode instructions |
| Group (GR) | check grouping and dependency rules group valid instructions execute return instructions |
| Read (RD) | read operands for address generation and control register update dispatch valid instructions to all functional units execute move immediate to control register instructions |
| Address Generation (AG) | calculate addresses for all loads and stores execute bit operations on control registers |
| Memory Read 0 (M0) | send registered address and request to the memory subsystem. |
| Memory Read 1 (M1) | load data from the memory subsystem register return data in the ORF (term defined below) read operands for execution from the ORF. |
| Execute (EX) | execute remaining instructions write results to the ORF or send results to BYP (term defined below) |
| Writeback (WB) | register results in the ORF or the ARF (term defined below) |

A load/store unit (LSU) 140 is coupled to, and under the control of, the PIP 130. The LSU 140 is responsible for retrieving the data that serves as operands for the instructions from memory (a process called "loading") and saving that data back to the memory as appropriate (a process called "storing"). Accordingly, though FIG. 1 does not show such, the LSU 140 is coupled to a data memory unit, which manages data memory to load and store data as directed by the LSU 140. The DSP 100 may be capable of supporting self-modifying code (code that changes during its own execution). If so, the LSU 140 is also responsible for loading and storing instructions making up that code as though the instructions were data.

As mentioned above, the DSP 100 contains various processing resources that can be brought to bear in the execution of instructions and the modification of the data in the data stream. An arithmetic logic unit (ALU) 150 performs general mathematical and logical operations (such as addition, subtraction, shifting, rotating and Boolean operations) and is coupled to, and under control of, both the ISU 120 and the PIP 130. A multiply-accumulate unit (MAC) and another ALU are provided in a MAC/accumulate unit (MAU) 160 to perform multiplication and division calculations and calculations that are substantially based on multiplication or division and, as the ALU 150, is coupled to, and under control of, both the ISU 120 and the PIP 130.

The DSP 100 contains very fast, but small, memory units used to hold information needed by instructions executing in the various stages of the pipeline. That memory is divided into individually designated locations called "registers." Because the various stages of the pipeline employ the registers in their instruction-processing, the registers are directly accessible by the stages. The DSP 100 specifically contains an address register file (ARF) 170 and an operand register file (ORF) 180. As the names imply, the ARF 170 holds addresses (typically corresponding to memory locations containing data used by the stages) and the ORF 180 holds operands (data that can be directly used without having to retrieve it from further memory locations).

Certain data may be required for more than one instruction. For example, the results of one calculation may be critical to a later calculation. Accordingly, a data forwarding unit (BYP) 190 ensures that results of earlier data processing in the pipeline are available for subsequent processing without unnecessary delay.

Though not illustrated in FIG. 1, the DSP 100 has an overall memory architecture that 100 is typical of conventional DSPs and microprocessors. That is, its registers are fast but small; its instruction and data caches (contained respectively in the PFU 110 and the LSU 140) are larger, but still inadequate to hold more than a handful of instructions or data; its local instruction memory and data memory 122 are larger still, but maybe inadequate to hold an entire program or all of its data. An external memory (not located within the DSP 100 itself) is employed to hold any excess instructions or data.

It should be noted in this context that the illustrated DSP 100 is of a Harvard architecture. Its instruction and data memories are separate, controlled by separate controllers and separately addressed by the PFU 110 and the LSU 140, respectively. Those skilled in the pertinent art should understand, however, that the principles of the present invention are as easily applied to a von Neumann architecture (one in which instruction and data memories are merged into a single logical entity).

Figure 2:
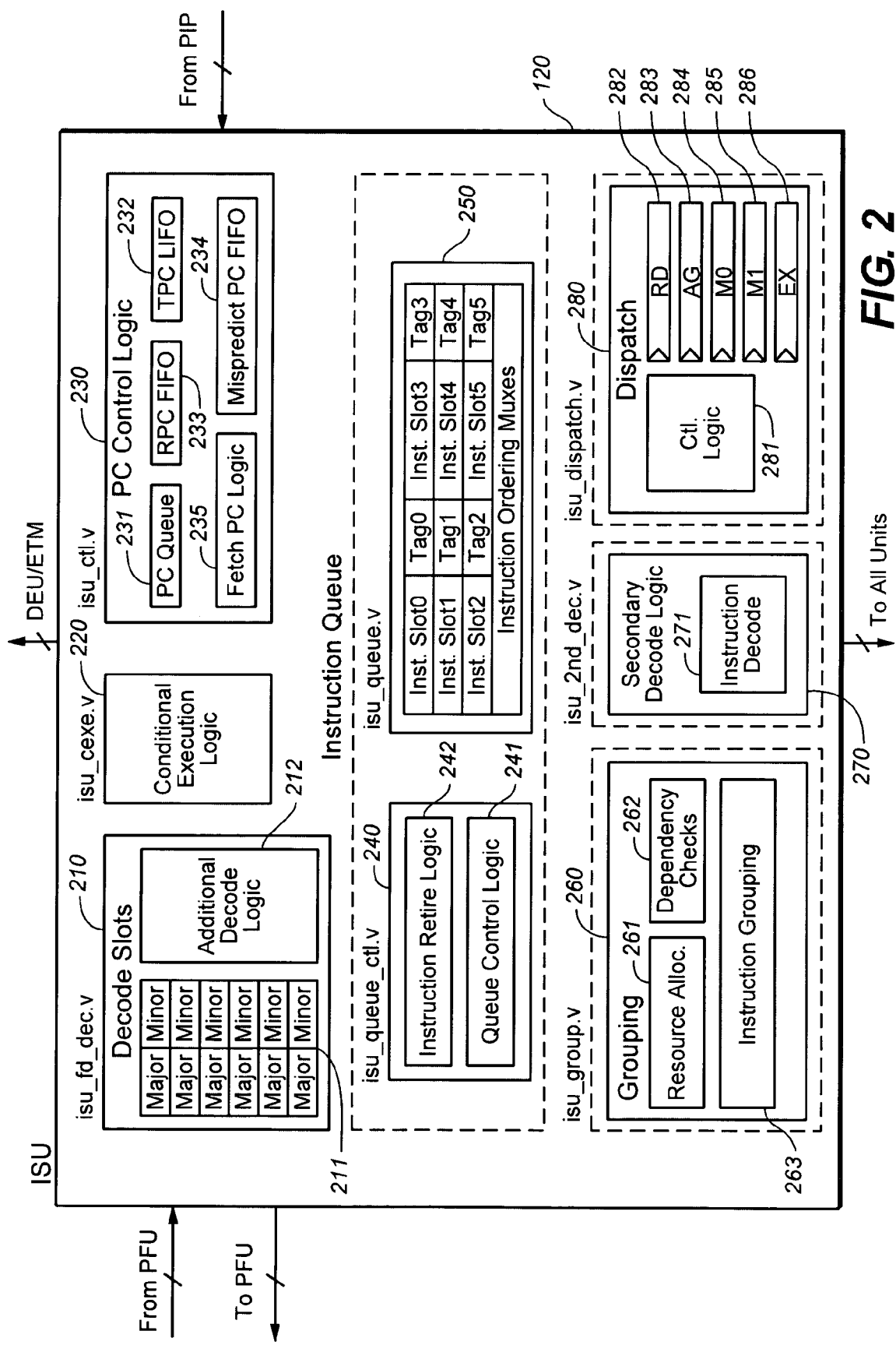
FIG. 2 illustrates in greater detail an instruction issue unit of the DSP of FIG. 1.

Turning now to FIG. 2, illustrated in greater detail is the ISU 120 of FIG. 1. Recall that the ISU 120 is responsible for the general task of instruction "issuance," which involves decoding instructions, determining what processing resources of the DSP 100 are required to execute the instructions, determining to what extent the instructions depend upon one another, queuing the instructions for execution by the appropriate resources (e.g., the ALU 150, the MAU 160, the ARF 170 and the ORF 180) and retiring instructions after they have been executed, invalidated or are otherwise no longer of use.

The illustrated ISU 120 is capable of decoding and issuing up to six instructions in order. To perform this function, the ISU 120 receives partially decoded instructions from an instruction queue within the PFU 110 of FIG. 1 and communicates with the F/D, GR, RD, AG, M0 and M1 stages of the pipeline to issue the instructions as appropriate.

The ISU 120 contains an instruction decode block isu_fd_dec 210; a conditional execution logic block isu_cexe 220; a program counter (PC) controller isu_ctl 230; an instruction queue (containing an instruction queue control block isu_queue_ctl 240 and an instruction queue block isu_queue 250); an instruction grouping block isu_group 260; a secondary control logic block isu_2nd_dec 270; and a dispatch logic block isu_dispatch 280.

The PFU 110 sends up to six partially-decoded and aligned instructions to isu_fd_dec 210. These instructions are stored in a six slot queue 211. Each slot in the queue 211 consists of major and minor opcode decoders and additional decode logic 212. The instructions are fully decoded in the F/D stage of the pipeline. The instructions in the queue 211 are only replaced (retired) from the queue 211 after having been successfully grouped in the GR stage.

The contents of the queue 211 are sent to grouping logic in the GR stage of the pipeline for hazard detection. Instruction grouping logic 263 within isu_group 260 governs the GR stage. The instruction grouping logic 263 embodies a predefined set of rules, implemented in hardware (including logic 262 devoted to performing dependency checks, e.g., write-after-write, read-after-write and write-after-read), that determines which instructions can be grouped together for execution in the same clock cycle. The grouping process is important to the operation and overall performance of the DSP 100, because instruction opcodes, instruction valid signals, operand register reads and relevant signals are dispatched to appropriate functional units in subsequent pipeline stages based upon its outcome. Resource allocation logic 261 assists in the dispatch of this information.

The conditional execution logic block isu_cexe 220 is responsible for identifying conditional execution (cexe) instructions and tagging the beginning and ending instructions of the cexe blocks that they define in the queue 211. When instructions in a cexe block are provided to the GR stage, they are specially tagged to ensure that the instruction grouping logic 263 groups them for optimal execution.

The PC controller isu_ctl 230 includes a PC register, a trap PC (TPC) register, activated when an interrupt is asserted, and a return PC (RPC) register, activated when a call occurs. These registers have associated queues: a PC queue 231, a TPC last-in, first-out (LIFO) queue 232 and an RPC first-in, first-out (FIFO) queue 233. isu_ctl 230 also contains logic to update these registers and queues 231, 232, 233. A mispredict PC register, a mispredict PC FIFO queue 234 and associated logic keep track of mispredictions. The mispredict PC register, the mispredict PC FIFO queue 234 and the associated logic will be described in greater detail in conjunction with FIGS. 3, 4 and 5, below.

Fetch PC logic 235 controls the prefetching of instructions and, accordingly, the PFU 110 of FIG. 1. Subsequent PCS are calculated based on the number of the instructions grouped in the GR stage and the current state of the DSP 100. The state of the DSP 100 is affected by interrupts, branch mispredictions and return instructions.

The instruction queue (containing isu_queue_ctl 240 and isu_queue 250) actually contains the instructions which are queued for dispatch to the pipeline. The queue itself, isu_queue 250, has six 91-bit entries and input and output multiplexers (not shown). isu_queue 250 has a variable depth that depends upon the number of instructions grouped therein. isu_queue_ctl 240 contains all isu_queue 250 control logic 241 and instruction retire logic 242. For the purpose of saving power, this instruction retire logic 242 checks for "tight loops." A "tight loop" is defined as a loop that has a maximum of six instructions. A tight loop can and should continue to reside within isu_queue 250 until it has been executed for the last time. This saves power and time by foregoing repeated reloading of the tight loop. As instructions are retired from isu_queue 250, newly decoded instructions in the queue 211 can be written to its empty slots.

The secondary control logic block isu_2nd_dec 270 provides additional instruction decode logic 271 for the GR, RD, MO and Ml stages of the pipeline. The main function of the additional instruction decode logic 271 is to provide additional information from each instruction's opcode to isu_group 260. The instruction decoders in isu_2nd_dec 270 are the same as those employed in the additional decode logic 212 of isu_fd_dec 210.

Finally, the dispatch logic block isu_dispatch 280 includes control logic 281, five native opcode staging registers 282, 283, 284, 285, 286 (corresponding to the RD, AG, M0, M1 and EX stages of the pipeline) and logic (not shown) to generate instruction valid signals. isu_dispatch 280 also transmits register addresses for source and destination registers and read enable signals to the BYP 190, the ORF 180, and the ARF 170. Among other things, the control logic 281 uses grouping information and a branch mispredict signal to determine when the staging registers 282, 283, 284, 285, 286 require updating.

As previously described, the mechanism for reducing pipeline stalls between conditional branches constructed according to the principles of the present invention is, in the DSP 100, contained within the PC controller isu_ctl 230 of FIG. 2. Those skilled in the art should understand, however, that the mechanism can be located in any suitable place within a DSP or processor.

Figure 3B:
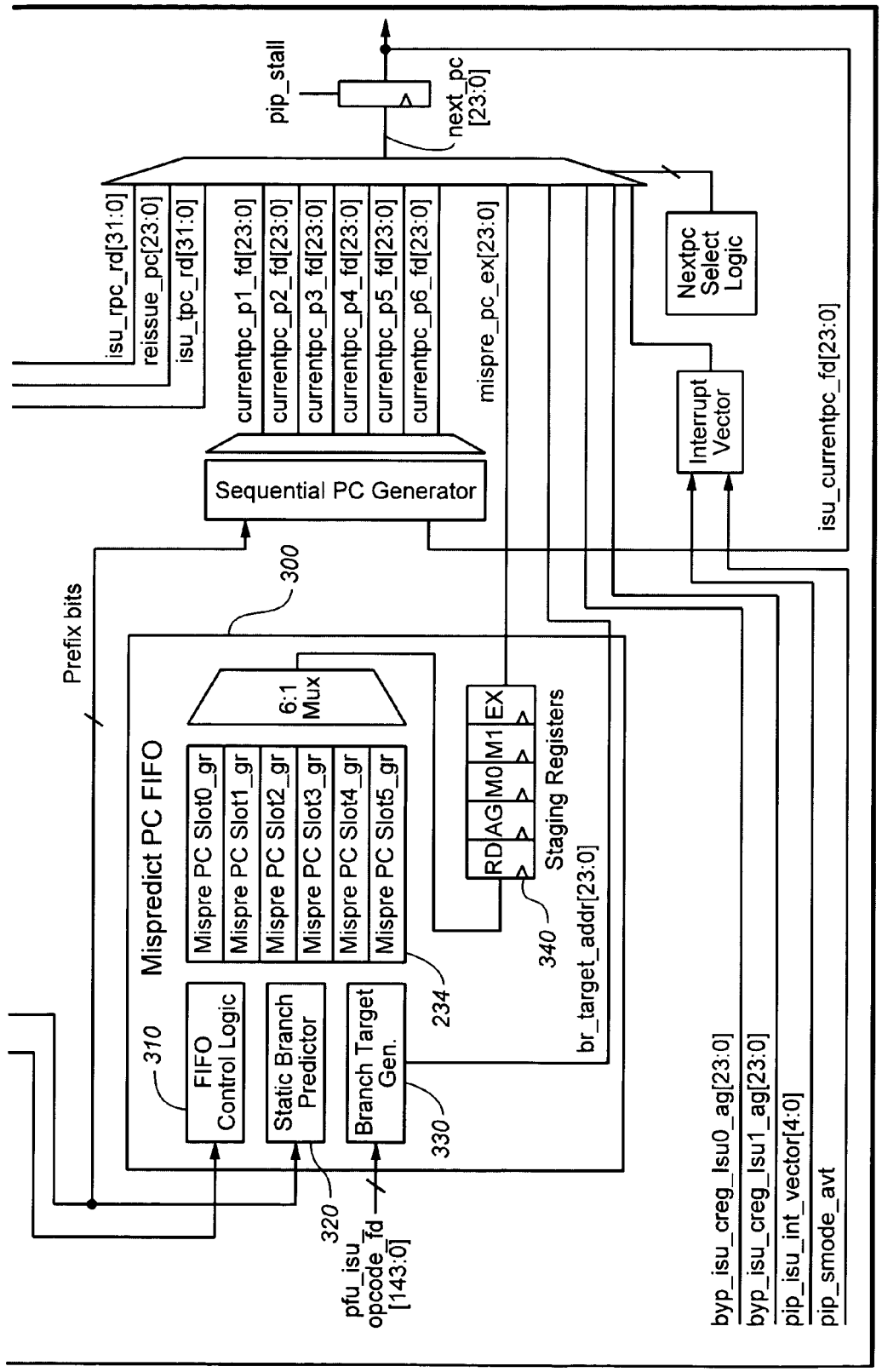
FIG. 3 illustrates the PC controller isu_ctl of FIG. 2, containing a mechanism for reducing pipeline stalls between conditional branches constructed according to the principles of the present invention.
Figure 4:
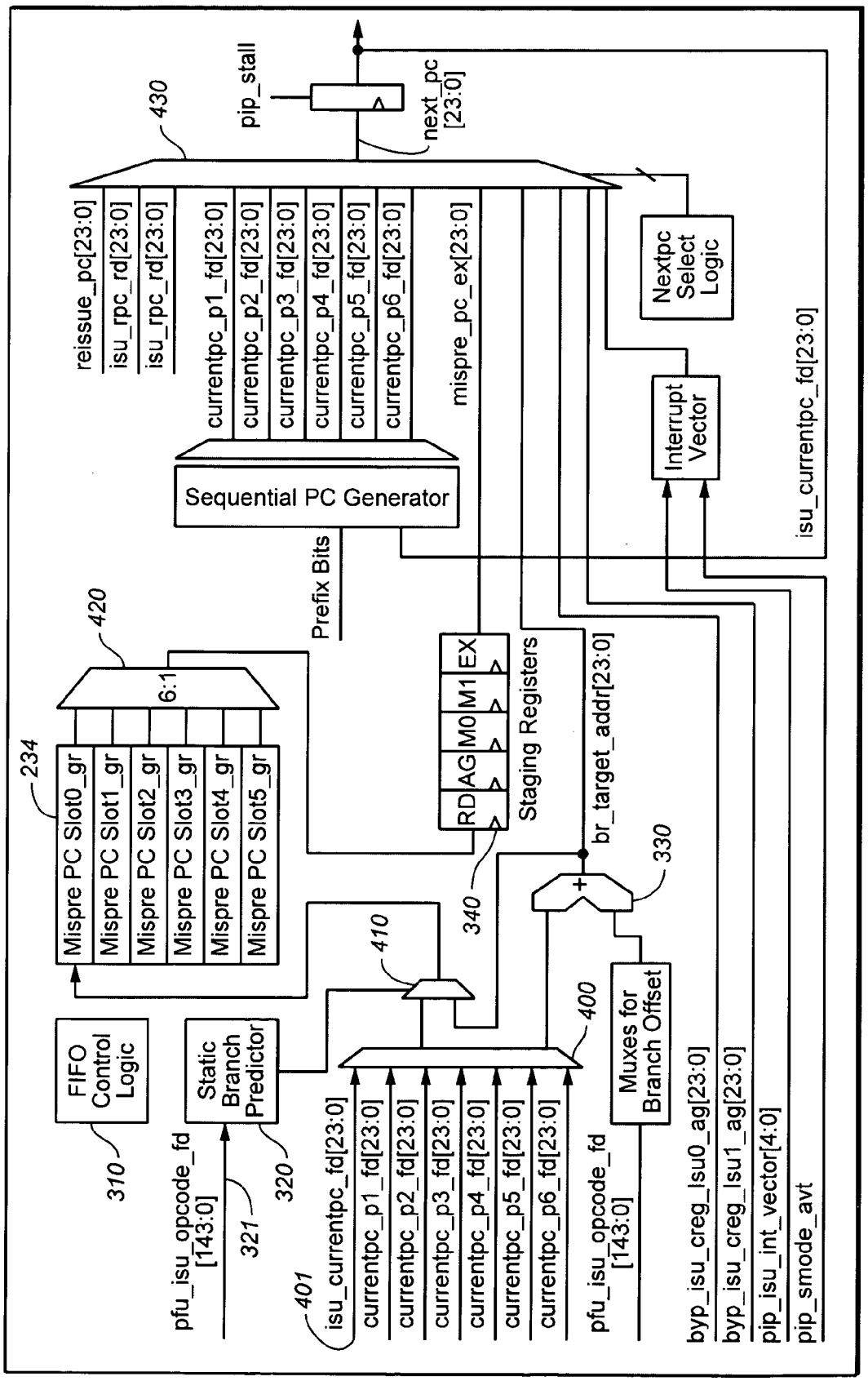
FIG. 4 illustrates in greater detail the mechanism of FIG. 3.

Turning now to FIG. 3, illustrated is the PC controller isu_ctl 230 of FIG. 2, containing a mechanism for reducing pipeline stalls between conditional branches constructed according to the principles of the present invention. The structure and operation of the mechanism will only be discussed in broad terms in conjunction with FIG. 3, since FIG. 4 provides a better illustration for delving into the details of the structure and operation.

A mispredict PC unit 300 contains FIFO control logic 310, a static branch predictor 320, a branch target address generator 330, the mispredict PC FIFO queue 234 and staging registers 340. The FIFO control logic 310 is responsible for controlling the operation of the mispredict PC unit 300 as a whole. The static branch predictor 320 is responsible for predicting whether conditional branches brought about by conditional branch instructions will be taken or not taken. The static branch predictor 320 can make these predictions by any conventional or later-discovered technique; such is not important to the present invention. The mispredict PC FIFO queue 234 and staging registers 340 cooperate with each other to form mispredict PC storage.

Every branch encountered in this environment has two, and only two, possible outcomes: taken and not taken. When the static branch predictor 320 predicts an outcome for a given conditional branch, the branch target address generator 330 generates a corresponding predicted target address. This predicted target address is eventually supplied to the PFU 110 of FIG. 1, allowing it to prefetch the targeted instruction.

A mispredict PC value, corresponding to the branch not predicted to be the outcome of the conditional branch, is generated and stored in the mispredict PC FIFO queue 234 for possible later use. The staging registers 340 allow the mispredict PC value to be drawn from the mispredict PC FIFO 234 and to track its corresponding conditional branch instruction as it moves through stages in the pipeline.

Turning now to FIG. 4, illustrated in greater detail is the mechanism of FIG. 3. A prefetched opcode (instruction) is provided to the static branch predictor 320 by way of a pfu_isu_opcode_fd bus 321. The current value of the PC from the PC queue (231 of FIG. 2) is available on an isu_currentpc_fd bus 401. That current value, along with the next six PC values (available on a current_pc_p1 bus 402, a current_pc_p2 bus 403, a current_pc_p3 bus 404, a current_PC_p4 bus 405, a current_pc_p5 bus 406 and a current_pc_p6 bus 407) are provided to a multiplexer 400 that selects one of the values to provide to a multiplexer 410 as a "branch not taken" PC value. The branch target address generator 330, which normally generates a branch target address for use by the static branch predictor 320, also provides the branch target address to the multiplexer 410. The static branch predictor 320, which normally generates a signal selecting the outcome of its prediction, also generates a signal representing the branch not predicted to be taken. This latter signal is provided to the multiplexer 410, resulting in the selection by the multiplexer 410 of a mispredict PC value. This value is provided to the mispredict PC FIFO queue 234.

Since the DSP 100 of FIG. 1 has six stages in its pipeline, the mispredict PC FIFO queue 234 has six slots. When the conditional branch instruction corresponding to a mispredict PC value contained in one of the slots actually enters the pipeline, that slot is selected by way of the multiplexer 420, causing the mispredict PC value to move into the staging registers 340. As the corresponding conditional branch instruction moves through the various stages of the pipeline (RD, AG, M0, M1, EX), the mispredict PC value moves through the corresponding RD, AG, M0, M1 and EX staging registers 340.

If a mispredict condition occurs (upon the resolution of a conditional branch instruction in the EX stage of the pipeline in the illustrated embodiment), the corresponding mispredict PC value is selected by way of a PC multiplexer 430 and is thereby transferred to the PC as part of an overall restoration of the DSP's state.

Figure 5:
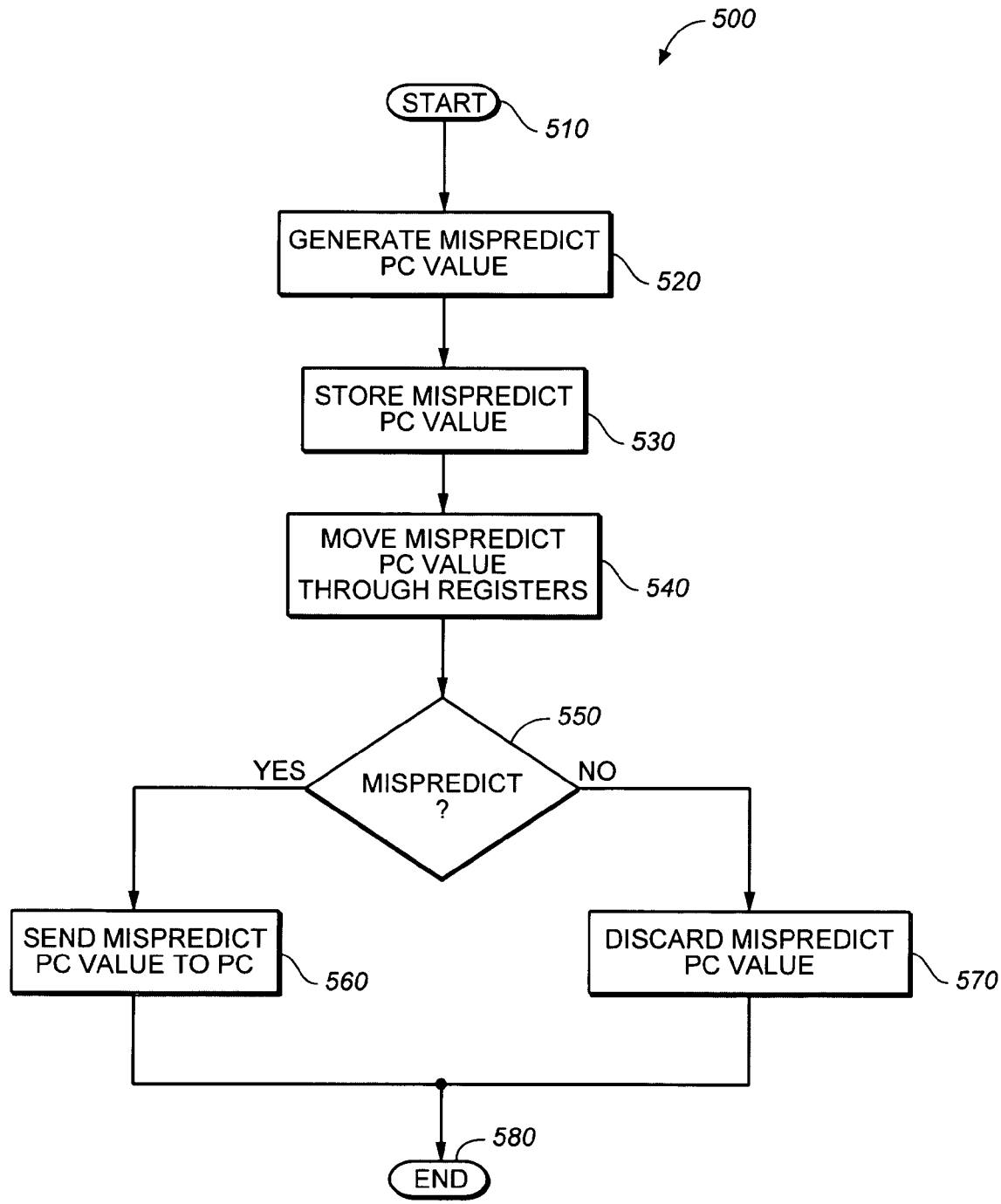
FIG. 5 illustrates a method of reducing pipeline stalls between conditional branches constructed according to the principles of the present invention.

Turning now to FIG. 5, illustrated is a method, generally designated 500, of reducing pipeline stalls between conditional branches constructed according to the principles of the present invention. The method 500 begins in a start step 510 wherein a conditional branch instruction is encountered by the static branch predictor (320 of FIG. 3). In a step 520, a mispredict PC value is generated for each conditional branch instruction. In a step 530, the generated mispredict PC value is stored in mispredict PC storage at least until a resolution of the conditional branch instruction occurs. Until then, the mispredict PC value moves through registers in the mispredict PC storage as the corresponding conditional branch instruction moves through corresponding stages in the pipeline in a step 540.

When the conditional branch instruction is resolved (in a decisional step 550) and results in a mispredict condition (YES branch), the mispredict PC value is made available to the PC (in a step 560), such that the DSP's state can be restored. Otherwise (NO branch), the prediction is correct and the mispredict PC value is discarded (in a step 570). In either case, the method 500 ends in an end step 580.

Although the present invention has been described in detail, those skilled in the art should understand that they can make various changes, substitutions and alterations herein without departing from the spirit and scope of the invention in its broadest form.

What is claimed is:

1. For use in a wide-issue pipelined processor, a mechanism for reducing pipeline stalls between conditional branches, comprising:

mispredict program counter (PC) queue, configured to store multiple mispredict PC values, wherein each of said multiple mispredict PC values corresponds to a conditional branch instruction to enter into a pipeline of said processor; and a mispredict PC value selector configured to select one of said multiple mispredict PC values to move to staging registers to track a corresponding conditional branch instruction as said corresponding conditional branch instruction moves through stages of said pipeline, said select based on when said corresponding conditional branch instruction enters said pipeline.

2. The mechanism as recited in claim 1 further comprising a mispredict PC generator configured to generate a mispredict PC value for each of said conditional branch instruction.

3. The mechanism as recited in claim 2 wherein said mispredict PC generator generates a branch prediction employed to prefetch instructions and said mispredict PC value in a single clock cycle.

4. The mechanism as recited in claim 1 wherein said staging registers and said mispredict PC queue form a mispredict PC storage.

5. The mechanism as recited in claim 1 wherein said mispredict PC queue has at least one more slot than said number of said staging registers.

6. The mechanism as recited in claim 1 wherein said one of said multiple mispredict PC values tracks said corresponding conditional branch instruction by moving through said staging registers as said corresponding conditional branch instruction moves through said stages in said pipeline.

7. The mechanism as recited in claim 4 wherein said mispredict PC storage stores said each of said mispredict PC values at least until a resolution of said corresponding conditional branch instruction occurs in an execution stage of said pipeline.

8. The mechanism as recited in claim 2 wherein said mispredict PC generator is configured to generate said mispredict PC value before branch instructions are grouped.

9. For use in a wide-issue pipelined processor, a method of reducing pipeline stalls between conditional branches, comprising:

storing multiple mispredict program counter (PC) values, wherein each of said multiple mispredict PC values corresponds to a conditional branch instruction to enter into a pipeline of said processor;

selecting one of said multiple mispredict PC values to move to staging registers to track a corresponding conditional branch instruction as said corresponding conditional branch instruction moves through stages of said pipeline; and basing said selecting on when said corresponding conditional branch instruction enters said pipeline.

10. The method as recited in claim 9 further comprising generating a mispredict PC value for each of said conditional branch instruction.

11. The method as recited in claim 10 wherein said generating is carried out in a single clock cycle, said method further comprising generating a branch prediction in a single clock cycle.

12. The method as recited in claim 9 wherein said selecting includes selecting one of said multiple mispredict PC values from a mispredict PC queue configured to store said multiple mispredict PC values.

13. The method as recited in claim 9 wherein said mispredict PC queue has at least one more slot than a number of staging registers employed with said storing.

14. The method as recited in claim 9 wherein said one of said multiple mispredict PC values tracks said corresponding conditional branch instruction by moving through said staging registers as said corresponding conditional branch instruction moves through stages in said pipeline.

15. The method as recited in claim 9 wherein said storing includes storing said each of said mispredict PC values at least until a resolution of said corresponding conditional branch instruction occurs in an execution stage of said pipeline.

16. The method as recited in claim 9 wherein said processor is a digital signal processor.

17. A digital signal processor, comprising:
a pipeline having stages capable of executing conditional branch instructions;
a wide-issue instruction issue unit;
mispredict program counter (PC) queue, that stores multiple mispredict PC values, wherein each of said multiple mispredict PC values corresponds to a conditional branch instruction to enter into said pipeline; and
a mispredict PC value selector that selects, based on when said corresponding conditional branch instruction enters said pipeline, one of said multiple mispredict PC values to move into staging registers to track said corresponding conditional branch instruction as said corresponding conditional branch instruction moves through said stages.

18. The DSP as recited in claim 17 further comprising a mispredict PC generator that generates a mispredict PC value for each of said conditional branch instruction.

19. The DSP as recited in claim 18 wherein said mispredict PC generator generates a branch prediction employed to prefetch instructions and said mispredict PC value in a single clock cycle.

20. The DSP as recited in claim 19 wherein said mispredict PC value selector is configured to select said one of said multiple mispredict PC values from said mispredict PC queue to cause said selected one to move through said staging registers to track said corresponding conditional branch instruction.

21. The DSP as recited in claim 17 wherein said mispredict PC queue has at least one more slot than said number of said staging registers.

22. The DSP as recited in claim 17 wherein said one of said multiple mispredict PC values tracks said corresponding conditional branch instruction by moving through said staging registers as said corresponding conditional branch instruction moves through said stages.

23. The DSP as recited in claim 17 wherein said mispredict PC queue and said staging registers form a mispredict PC storage that stores said each of said mispredict PC values at least until a resolution of said corresponding conditional branch instruction and said resolution occurs in an execution stage of said pipeline.

* * * * *